United States Patent
Delabriere et al.

(10) Patent No.: US 10,378,384 B2
(45) Date of Patent: *Aug. 13, 2019

(54) OPTIMIZED AERODYNAMIC PROFILE FOR AN ARM OF A STRUCTURAL CASING OF A TURBINE, AND STRUCTURAL CASING HAVING SUCH AN ARM

(71) Applicant: SAFRAN AIRCRAFT ENGINES, Paris (FR)

(72) Inventors: Maxime Didier Delabriere, Maisons-Alfort (FR); Pascal Pierre Routier, Le Mee sur Seine (FR); Pierre Hervé Marche, Saint Serotin (FR); Vincent Nicolas Leonardon, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 268 days.

This patent is subject to a terminal disclaimer.

(21) Appl. No.: 15/439,285

(22) Filed: Feb. 22, 2017

(65) Prior Publication Data

US 2018/0016940 A1  Jan. 18, 2018

Related U.S. Application Data (60) Provisional application No. 62/361,561, filed on Jul. 13, 2016.

(51) Int. Cl.
*F01D 25/24* (2006.01)
*F01D 5/14* (2006.01)
(Continued)

(52) U.S. Cl.
CPC .......... *F01D 25/246* (2013.01); *F01D 5/147* (2013.01); *F01D 9/042* (2013.01); *F01D 25/162* (2013.01); F05D 2220/323 (2013.01); F05D 2240/14 (2013.01); F05D 2240/24 (2013.01); F05D 2240/30 (2013.01); F05D 2250/74 (2013.01); Y02T 50/673 (2013.01)

(58) Field of Classification Search
CPC . F01D 5/14; F01D 5/141; F04D 29/30; F04D 29/32; F04D 29/324; F04D 29/38; F04D 29/384
USPC ................ 416/223 A, 241, 242, 243, DIG. 2
See application file for complete search history.

(56) References Cited

U.S. PATENT DOCUMENTS

| | | | |
|---|---|---|---|
| 2007/0068136 A1 | 3/2007 | Cameriano et al. | |
| 2015/0110629 A1* | 4/2015 | Brozyna | F01D 5/143 416/203 |

(Continued)

*Primary Examiner* — John Kwon
*Assistant Examiner* — Johnny H Hoang
(74) *Attorney, Agent, or Firm* — Bookoff McAndrews, PLLC (57) ABSTRACT

When in a cold state and in a non-coated state, the aerodynamic profile for an arm of a structural casing of a turbine having a hub and a shroud is substantially identical to a nominal profile determined by specific Cartesian coordinates X,Y, Zadim. The coordinate Zadim is the quotient D/H where D is a distance of the point under consideration from a first reference plane P0 situated at the base of the nominal profile, and H is the height of said profile measured from the first reference plane to a second reference plane P1. The measurements D and H are taken radially relative to the axis of the turbine, while the X coordinate is measured in the axial direction of the turbine.

13 Claims, 2 Drawing Sheets

(51) Int. Cl.
*F01D 9/04* (2006.01)
*F01D 25/16* (2006.01)

(56) References Cited

U.S. PATENT DOCUMENTS

2017/0226863 A1* 8/2017 Brozyna ................. F01D 5/141
2017/0226864 A1* 8/2017 Honkomp ............... F01D 5/143

* cited by examiner

FIG.2

OPTIMIZED AERODYNAMIC PROFILE FOR AN ARM OF A STRUCTURAL CASING OF A TURBINE, AND STRUCTURAL CASING HAVING SUCH AN ARM

CROSS-REFERENCE TO RELATED APPLICATIONS

This application claims the benefit under 35 U.S.C. § 119 to U.S. Provisional Application No. 62/361,561, filed Jul. 13, 2016, the entirety of which is herein incorporated by reference.

FIELD OF THE INVENTION

The present invention relates to an aerodynamic profile for an arm of a structural casing of a turbine.

In particular, the invention relates to the aerodynamic profile of an arm connecting a central hub and a shroud of such casing.

The invention relates in particular to the aerodynamic profile of a main arm belonging to a series of arms connecting the central hub and the shroud, said series comprising at least one main arm and at least one secondary arm, the main arm being arranged in the continuation of a link connecting the shroud to an external ring, while the secondary arm is not located in the continuation of such link.

INTRODUCTION

More particularly, the turbine is a low pressure turbine of the type used in a turbojet of an aircraft.

In particular, the structural casing is an exhaust casing of the turbine.

The exhaust casing may be of the type disclosed in the published US patent application No. 2007068136, the contents of which is herein incorporated.

An arm of a structural casing of a turbine is subject to a series of constraints. In particular, the aerodynamic profile of such an arm participates to the global efficiency of the turbine and, as such, it should enable the turbine to provide the desired efficiency. In order to do that it must be such that the flow of air around the profile is sound, i.e. substantially such that it does not give rise to turbulence, which is harmful for overall efficiency.

It must be capable of being installed properly in the environment of the turbine.

Furthermore, the arm must present a profile enabling it to be manufactured in a reliable and cost-effective manner by available manufacturing methods, such as casting, forging, machining, additive fabrication, or else weaving, without this list being limitative.

Furthermore, the profile of the arm must enable it to withstand the mechanical stresses to which the arm is subjected, by enabling those stresses to be spread over the entire arm in such a manner as to avoid premature wear thereof, both in static and in dynamic modes.

In particular, the arm being a connection arm between a central hub and a shroud of the turbine, it shall be capable of efficiently contributing to ensure proper mechanical connection between the central hub and the shroud, and of being fastened easily to the central hub and to the shroud of the casing. Also, in such case, the arm contributes to the proper centering and positioning of the shroud with respect to the central hub. Also, in case the casing is an exhaust casing of the turbine engine, the arm participates in ensuring the rear fixation of the engine to the fuselage of the aircraft.

Also, in the specific case of a main arm of a series of arms connecting the central hub and the shroud, the arm must be able to bear heavy mechanical stresses which are due to its position aligned with a link connecting the shroud to the external ring.

In addition, in such case, the arm contributes to redressing the flow coming from the primary thrust nozzle of the turbine engine.

An object of the invention is to propose an aerodynamic profile for an arm of a structural casing of a turbine having a central hub and a shroud, said profile being optimized, and capable of satisfying those objectives.

This object is achieved by the fact that when cold and in a non-coated state, said profile is substantially identical to a nominal profile determined by the Cartesian coordinates X,Y,Zadim given in Table 1, in which the coordinate Zadim is the quotient D/H where D is the distance of the point under consideration from a first reference X,Y plane situated at the base of the nominal profile, and H is the height of said profile measured from said first reference plane that is the intersection of the stacking axis of the arm and the axisymmetric surface of the hub, out to a second reference plane that is the intersection of said stacking axis with the axisymmetric inner surface of the shroud casing, the measurements D and H being taken radially relative to the axis of the turbine, while the coordinate X is measured in the axial direction of the turbine.

This profile has been determined as a result of numerous tests and simulations. It is defined cold, i.e. at an ambient temperature of 20° C. That is a reference temperature at which the profile is geometrically determined. The above-mentioned objectives of aerodynamics and mechanical optimization are naturally valid for the conditions of use of this aerodynamic profile, i.e. when hot, at a temperature that is stabilized when the engine of which the turbine forms a part is being used under cruising conditions.

Furthermore, the aerodynamic profile of the invention is defined in the non-coated state. Since arms of turbine casings are subjected to high temperature gradients, it is common practice for them to be provided with a coating having thermal properties enabling them more easily to withstand such temperature variations. The profile is determined prior to installing such a coating.

It is stated above that the profile of the invention is "substantially identical" to the nominal profile. This means that the profile may depart very slightly from said nominal profile.

The aerodynamic profile is thus preferably defined within an envelope of ±1 millimeter (mm) in a direction normal to the surface of the nominal profile.

This variation takes account in particular of manufacturing tolerances of the profile.

It is also preferable for the X,Y coordinates of the aerodynamic profile to lie within a range of ±5% relative to the X,Y coordinates of the nominal profile.

This variation takes account of the setting of the profile to adapt to the flow coming from the turbine sections situated upstream, so as to further improve the efficiency of the turbine.

BRIEF DESCRIPTION OF THE DRAWINGS

The invention can be better understood and its advantages appear better on reading the following detailed description of an embodiment given by way of non-limiting example. The description refers to the accompanying drawings, in which.

DETAILED DESCRIPTION

Figure 1:
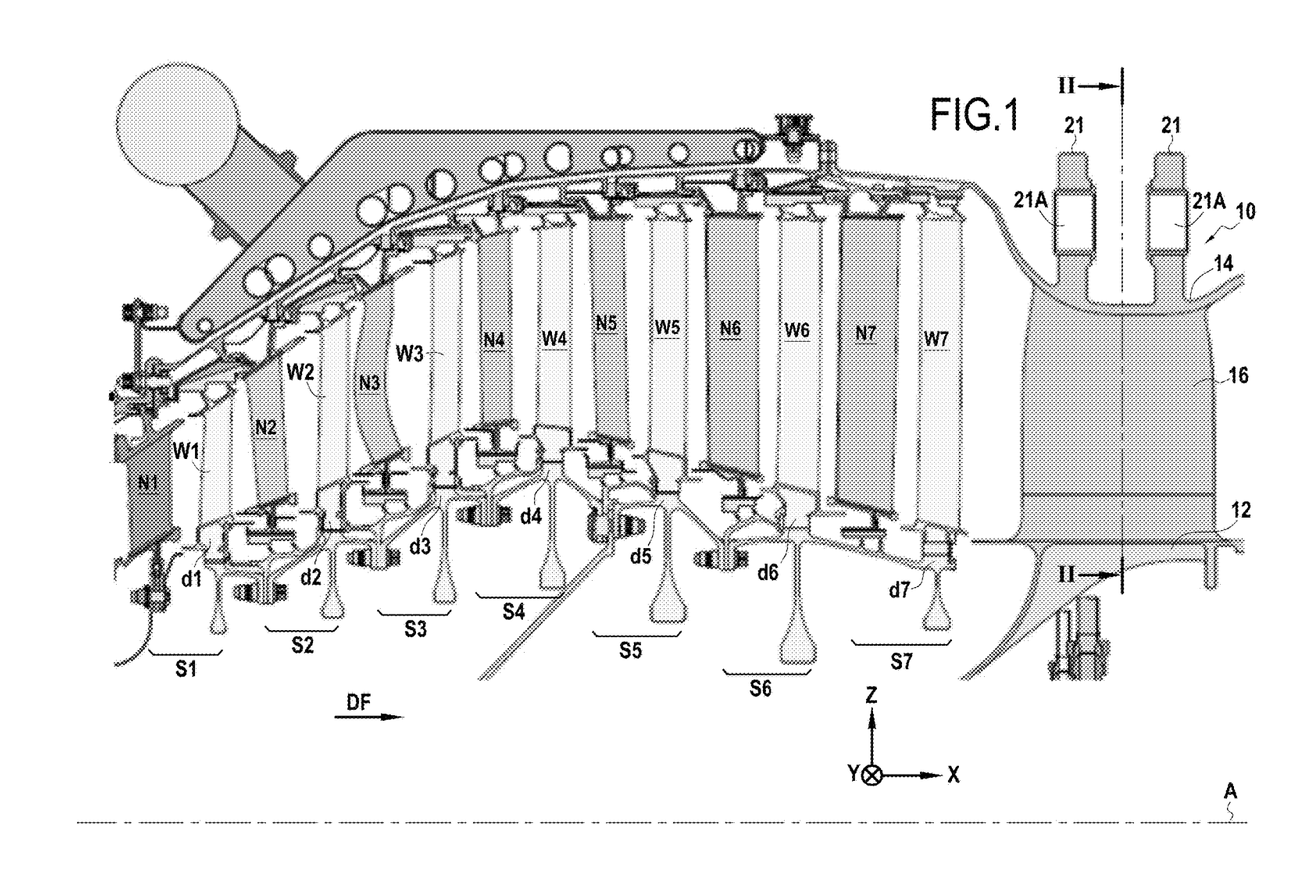
FIG. 1 is a fragmentary axial section view of a turbine including an exhaust casing having an arm of profile that corresponds to that of the invention.

The turbine shown in axial section in FIG. 1 comprises seven stages referenced respectively S1 to S7. In the direction DF going from upstream to downstream, each stage comprises a nozzle that forms a portion of the stator of the turbine and that has a plurality of radially-oriented vanes, and a rotary wheel that forms a portion of the rotor of the turbine and that likewise includes a plurality of radially-oriented blades.

In FIG. 1, the vanes of the nozzles of stages S1 to S7 are given references N1 to N7, whereas the blades of rotary wheels of stages S1 to S7 are given respective references W1 to W7.

In known manner, the vanes of the nozzles are fastened at both ends to stationary structure portions, while the blades of the rotary wheels are fastened to a rotary disk via their roots that are formed at their radially-inner ends closer to the axis of the rotation A of the turbine. The various disks designated by respective references d1 to d7 are constrained to rotate together. In the example shown, the tips of the blades of the rotary wheels, formed at their radially-outer ends, carry top platforms.

As shown in FIG. 1, the turbine further comprises an exhaust casing 10 comprising a central hub 12, a shroud 14 and a plurality of arms 16 connecting the hub 12 and the shroud 14. As shown on FIG. 2, the shroud 14 is connected to an external ring 18 by suspension links 20. These suspension links 20 comprise joints 21 fixed to the shroud 14, projecting outwardly from the external surface of the shroud and provided with eyelets 21A for connection to connection rods 22 via pins or similar. Similarly, the external ring 18 is provided with similar joints 23 projecting inwardly from its internal surface and provided with eyelets for connection to connection to the connection rods 22, so that the connection rods extend between the joints 21 and 22. The central hub, the shroud and the external ring are arranged concentrically.

As mentioned, the exhaust casing is of the type disclosed by the published US patent application No. 2007068136. The arms 16 serve to connect the central hub 12 to the shroud 14. In a known manner, the central hub serves as a bearing support, for bearings supporting rotary parts of the turbine, especially a rotating shaft (not shown) to which the rotary disks are mounted.

The suspension links 20 connecting the shroud 14 and the external ring 18 serve to transmit the mechanical loads (landings, steering maneuvers, thrust, engine unbalance) between the hub 12, the arms 16, the intermediate annular shroud 14 and the external ring 18. The arms 16 have a profiled hollow structure which is dimensioned to withstand these mechanical loads.

Figure 2:
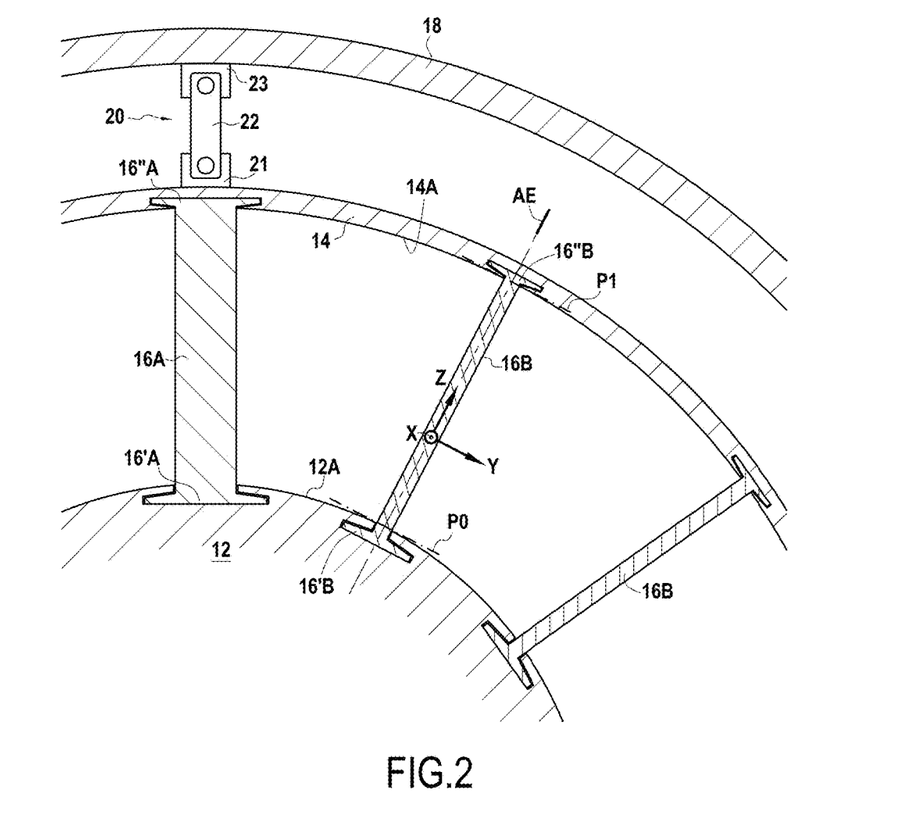
FIG. 2 is a partial view of the exhaust casing taken on line II-II of FIG. 1.

As best seen in FIG. 2, and as mentioned in US 2007068136, the arms 16 comprise two categories of arms, namely at least one main arm 16A and at least one secondary arm 16B. The at least one main arm 16A is arranged in the continuation of a link 20, while the at least one secondary arm is not located in the continuation of a link. Basically, the number of main arms is the same as the number of links, one main arm extending in the continuation of each link. For example, the casing may comprise a total of 10 to 20 arms, including between 3 and 5 main arms and between 7 and 17 secondary arms.

As mentioned in US2007/068136 the main arms are subject to more mechanical stress and loading than the secondary arms and, as such, may have thicker walls than the secondary arms.

The arms 16A and 16B each include a root platform, respectively 16'A and 16'B for attaching the arm to the central hub 12, as well as a top platform, respectively 16"A and 16"B, for attaching the arm to the shroud 14. These root platform and top platform are embedded in, respectively, the external cylindrical surface of the central hub 12 and the internal cylindrical surface of the shroud.

By convention, the aerodynamic profile of the arm is the entire portion of said arm that extends radially from the external cylindrical surface of the central hub to the internal cylindrical surface of the shroud.

The invention relates in particular to a main arm 16A connecting the central hub and the shroud.

In FIG. 2, there can be seen a frame of reference comprising Cartesian coordinates X,Y,Z. The radial direction Z is the height direction of the arm, which extends radially from its root platform to its top platform. This direction Z is perpendicular to the axial direction X which is the direction of the axis of rotation A of the turbine. The direction Y is perpendicular to the X,Z plane and is therefore tangential to the direction of rotation of the turbine.

The nominal profile from which the aerodynamic profile of the invention is determined is defined in following Table 1 of coordinates, in which the coordinates Zadim, measured along the axis Z is non-dimensional, whereas the dimensions X and Y, respectively measured along the axes X and Y, are expressed in millimeters.

TABLE 1

| X | Y | Zadim |
|---|---|---|
| −47.0732 | −50.7688 | −0.1087 |
| −47.0984 | −51.0054 | −0.1087 |
| −47.1005 | −51.3511 | −0.1087 |
| −47.0403 | −51.8812 | −0.1087 |
| −46.8625 | −52.6031 | −0.1087 |
| −46.5161 | −53.5103 | −0.1087 |
| −45.9591 | −54.5869 | −0.1087 |
| −45.1566 | −55.8104 | −0.1087 |
| −44.0795 | −57.1518 | −0.1087 |
| −42.7043 | −58.5765 | −0.1087 |
| −41.0133 | −60.0446 | −0.1087 |
| −38.996 | −61.513 | −0.1087 |
| −36.6499 | −62.9372 | −0.1087 |
| −33.9819 | −64.2755 | −0.1087 |
| −31.0073 | −65.4921 | −0.1087 |
| −27.7487 | −66.5594 | −0.1087 |
| −24.2333 | −67.4587 | −0.1087 |
| −20.4917 | −68.1804 | −0.1087 |
| −16.5554 | −68.7226 | −0.1087 |
| −12.4559 | −69.09 | −0.1087 |
| −8.22411 | −69.2919 | −0.1087 |
| −3.88985 | −69.3407 | −0.1087 |
| 0.518025 | −69.2507 | −0.1087 |
| 4.972009 | −69.036 | −0.1087 |
| 9.445069 | −68.7109 | −0.1087 |
| 13.91133 | −68.2922 | −0.1087 |
| 18.34583 | −67.7967 | −0.1087 |
| 22.72447 | −67.2403 | −0.1087 |
| 27.0239 | −66.6375 | −0.1087 |
| 31.22159 | −66.0011 | −0.1087 |
| 35.29632 | −65.3454 | −0.1087 |
| 39.2279 | −64.6829 | −0.1087 |
| 42.99731 | −64.0248 | −0.1087 |
| 46.58676 | −63.38 | −0.1087 |

TABLE 1-continued

| X | Y | Zadim |
|---|---|---|
| 49.98002 | −62.7571 | −0.1087 |
| 53.16267 | −62.1635 | −0.1087 |
| 56.12206 | −61.6052 | −0.1087 |
| 58.84762 | −61.087 | −0.1087 |
| 61.33105 | −60.6122 | −0.1087 |
| 63.56652 | −60.1834 | −0.1087 |
| 65.55093 | −59.8021 | −0.1087 |
| 67.28416 | −59.469 | −0.1087 |
| 68.76914 | −59.1836 | −0.1087 |
| 70.01222 | −58.9448 | −0.1087 |
| 71.02325 | −58.7506 | −0.1087 |
| 71.7981 | −58.5226 | −0.1087 |
| 72.20719 | −58.0766 | −0.1087 |
| 72.34547 | −57.68 | −0.1087 |
| 72.36406 | −57.4152 | −0.1087 |
| 72.34058 | −57.2126 | −0.1087 |
| 72.28782 | −57.0224 | −0.1087 |
| 72.17542 | −56.7915 | −0.1087 |
| 71.90852 | −56.485 | −0.1087 |
| 71.37787 | −56.2371 | −0.1087 |
| 70.59687 | −56.2414 | −0.1087 |
| 69.60128 | −56.277 | −0.1087 |
| 68.37682 | −56.3082 | −0.1087 |
| 66.91372 | −56.3284 | −0.1087 |
| 65.20589 | −56.3294 | −0.1087 |
| 63.25072 | −56.3021 | −0.1087 |
| 61.04909 | −56.2371 | −0.1087 |
| 58.60507 | −56.1249 | −0.1087 |
| 55.9257 | −55.9569 | −0.1087 |
| 53.02079 | −55.7248 | −0.1087 |
| 49.9027 | −55.4217 | −0.1087 |
| 46.58596 | −55.0425 | −0.1087 |
| 43.08698 | −54.5839 | −0.1087 |
| 39.42385 | −54.0444 | −0.1087 |
| 35.61605 | −53.4239 | −0.1087 |
| 31.68405 | −52.7251 | −0.1087 |
| 27.64898 | −51.9529 | −0.1087 |
| 23.53235 | −51.1149 | −0.1087 |
| 19.35597 | −50.2207 | −0.1087 |
| 15.14176 | −49.2809 | −0.1087 |
| 10.91147 | −48.3081 | −0.1087 |
| 6.68409 | −47.3269 | −0.1087 |
| 2.481481 | −46.3491 | −0.1087 |
| −1.67852 | −45.4029 | −0.1087 |
| −5.77682 | −44.5109 | −0.1087 |
| −9.79541 | −43.7005 | −0.1087 |
| −13.7163 | −43.0014 | −0.1087 |
| −17.5205 | −42.4436 | −0.1087 |
| −21.1874 | −42.0555 | −0.1087 |
| −24.6929 | −41.8604 | −0.1087 |
| −28.0109 | −41.8742 | −0.1087 |
| −31.1125 | −42.1012 | −0.1087 |
| −33.9684 | −42.5327 | −0.1087 |
| −36.5523 | −43.1464 | −0.1087 |
| −38.8435 | −43.9078 | −0.1087 |
| −40.8299 | −44.7738 | −0.1087 |
| −42.5083 | −45.6979 | −0.1087 |
| −43.8843 | −46.6349 | −0.1087 |
| −44.9705 | −47.543 | −0.1087 |
| −45.7869 | −48.3853 | −0.1087 |
| −46.3603 | −49.1297 | −0.1087 |
| −46.7265 | −49.749 | −0.1087 |
| −46.9315 | −50.2228 | −0.1087 |
| −47.0434 | −48.0939 | −0.05435 |
| −47.0686 | −48.3304 | −0.05435 |
| −47.0708 | −48.676 | −0.05435 |
| −47.0109 | −49.206 | −0.05435 |
| −46.8338 | −49.9279 | −0.05435 |
| −46.4885 | −50.8352 | −0.05435 |
| −45.9329 | −51.9123 | −0.05435 |
| −45.1323 | −53.1366 | −0.05435 |
| −44.0573 | −54.479 | −0.05435 |
| −42.6843 | −55.9051 | −0.05435 |
| −40.9955 | −57.3749 | −0.05435 |
| −38.9802 | −58.845 | −0.05435 |
| −36.6361 | −60.2711 | −0.05435 |
| −33.9698 | −61.6111 | −0.05435 |
| −30.9967 | −62.8292 | −0.05435 |
| −27.7393 | −63.8978 | −0.05435 |
| −24.2252 | −64.798 | −0.05435 |
| −20.4846 | −65.5202 | −0.05435 |
| −16.5493 | −66.0627 | −0.05435 |
| −12.4509 | −66.4302 | −0.05435 |
| −8.22019 | −66.6319 | −0.05435 |
| −3.88702 | −66.6803 | −0.05435 |
| 0.519732 | −66.5899 | −0.05435 |
| 4.972564 | −66.3747 | −0.05435 |
| 9.444458 | −66.0492 | −0.05435 |
| 13.90954 | −65.6301 | −0.05435 |
| 18.34285 | −65.1341 | −0.05435 |
| 22.72032 | −64.5773 | −0.05435 |
| 27.01859 | −63.9741 | −0.05435 |
| 31.21515 | −63.3374 | −0.05435 |
| 35.28877 | −62.6813 | −0.05435 |
| 39.21928 | −62.0186 | −0.05435 |
| 42.98768 | −61.3602 | −0.05435 |
| 46.57616 | −60.7153 | −0.05435 |
| 49.96851 | −60.0922 | −0.05435 |
| 53.15031 | −59.4986 | −0.05435 |
| 56.10891 | −58.9402 | −0.05435 |
| 58.83374 | −58.4219 | −0.05435 |
| 61.31651 | −57.9471 | −0.05435 |
| 63.55139 | −57.5183 | −0.05435 |
| 65.53529 | −57.137 | −0.05435 |
| 67.26807 | −56.8038 | −0.05435 |
| 68.75265 | −56.5184 | −0.05435 |
| 69.99539 | −56.2796 | −0.05435 |
| 71.00618 | −56.0855 | −0.05435 |
| 71.78099 | −55.8581 | −0.05435 |
| 72.19086 | −55.413 | −0.05435 |
| 72.32938 | −55.0166 | −0.05435 |
| 72.34807 | −54.7519 | −0.05435 |
| 72.3246 | −54.5493 | −0.05435 |
| 72.27184 | −54.3592 | −0.05435 |
| 72.1594 | −54.1284 | −0.05435 |
| 71.89236 | −53.8222 | −0.05435 |
| 71.36143 | −53.5754 | −0.05435 |
| 70.58067 | −53.5798 | −0.05435 |
| 69.5854 | −53.6153 | −0.05435 |
| 68.36134 | −53.6465 | −0.05435 |
| 66.8987 | −53.6666 | −0.05435 |
| 65.19138 | −53.6674 | −0.05435 |
| 63.23686 | −53.64 | −0.05435 |
| 61.03594 | −53.5748 | −0.05435 |
| 58.59269 | −53.4624 | −0.05435 |
| 55.91418 | −53.294 | −0.05435 |
| 53.01023 | −53.0616 | −0.05435 |
| 49.89317 | −52.7582 | −0.05435 |
| 46.57753 | −52.3785 | −0.05435 |
| 43.07975 | −51.9194 | −0.05435 |
| 39.41786 | −51.3794 | −0.05435 |
| 35.61139 | −50.7584 | −0.05435 |
| 31.68077 | −50.0589 | −0.05435 |
| 27.64714 | −49.2861 | −0.05435 |
| 23.53201 | −48.4475 | −0.05435 |
| 19.35716 | −47.5526 | −0.05435 |
| 15.14453 | −46.6119 | −0.05435 |
| 10.91582 | −45.6383 | −0.05435 |
| 6.69003 | −44.6564 | −0.05435 |
| 2.48905 | −43.6775 | −0.05435 |
| −1.66936 | −42.7305 | −0.05435 |
| −5.7661 | −41.8375 | −0.05435 |
| −9.78318 | −41.0262 | −0.05435 |
| −13.7026 | −40.3261 | −0.05435 |
| −17.5055 | −39.7675 | −0.05435 |
| −21.1711 | −39.3786 | −0.05435 |
| −24.6755 | −39.1829 | −0.05435 |
| −27.9924 | −39.1961 | −0.05435 |
| −31.0931 | −39.4228 | −0.05435 |
| −33.9481 | −39.8541 | −0.05435 |
| −36.5311 | −40.4679 | −0.05435 |
| −38.8215 | −41.2295 | −0.05435 |
| −40.8069 | −42.0959 | −0.05435 |
| −42.4843 | −43.0206 | −0.05435 |
| −43.8592 | −43.9583 | −0.05435 |
| −44.9443 | −44.867 | −0.05435 |

TABLE 1-continued

| X | Y | Zadim |
|---|---|---|
| −45.7596 | −45.7099 | −0.05435 |
| −46.332 | −46.4546 | −0.05435 |
| −46.6974 | −47.0741 | −0.05435 |
| −46.902 | −47.548 | −0.05435 |
| −47.0136 | −45.4189 | 0 |
| −47.0388 | −45.6554 | 0 |
| −47.0411 | −46.0009 | 0 |
| −46.9815 | −46.5308 | 0 |
| −46.8052 | −47.2527 | 0 |
| −46.461 | −48.1602 | 0 |
| −45.9069 | −49.2377 | 0 |
| −45.108 | −50.4627 | 0 |
| −44.035 | −51.8062 | 0 |
| −42.6642 | −53.2337 | 0 |
| −40.9776 | −54.7052 | 0 |
| −38.9644 | −56.1771 | 0 |
| −36.6222 | −57.6049 | 0 |
| −33.9576 | −58.9467 | 0 |
| −30.986 | −60.1663 | 0 |
| −27.73 | −61.2362 | 0 |
| −24.217 | −62.1373 | 0 |
| −20.4776 | −62.8601 | 0 |
| −16.5434 | −63.4029 | 0 |
| −12.446 | −63.7704 | 0 |
| −8.2163 | −63.9719 | 0 |
| −3.88423 | −64.02 | 0 |
| 0.521404 | −63.9291 | 0 |
| 4.97309 | −63.7135 | 0 |
| 9.443818 | −63.3875 | 0 |
| 13.90772 | −62.9679 | 0 |
| 18.33984 | −62.4715 | 0 |
| 22.71614 | −61.9143 | 0 |
| 27.01324 | −61.3107 | 0 |
| 31.20867 | −60.6737 | 0 |
| 35.28119 | −60.0173 | 0 |
| 39.21065 | −59.3543 | 0 |
| 42.97803 | −58.6957 | 0 |
| 46.56553 | −58.0506 | 0 |
| 49.95697 | −57.4274 | 0 |
| 53.13791 | −56.8336 | 0 |
| 56.09573 | −56.2752 | 0 |
| 58.81984 | −55.7568 | 0 |
| 61.30195 | −55.282 | 0 |
| 63.53624 | −54.8531 | 0 |
| 65.51962 | −54.4718 | 0 |
| 67.25194 | −54.1386 | 0 |
| 68.73613 | −53.8532 | 0 |
| 69.97855 | −53.6145 | 0 |
| 70.98908 | −53.4204 | 0 |
| 71.76386 | −53.1936 | 0 |
| 72.17449 | −52.7494 | 0 |
| 72.31327 | −52.3532 | 0 |
| 72.33204 | −52.0886 | 0 |
| 72.30861 | −51.886 | 0 |
| 72.25585 | −51.696 | 0 |
| 72.14337 | −51.4654 | 0 |
| 71.87619 | −51.1594 | 0 |
| 71.34498 | −50.9137 | 0 |
| 70.56448 | −50.9182 | 0 |
| 69.5695 | −50.9537 | 0 |
| 68.34583 | −50.9848 | 0 |
| 66.88365 | −51.0048 | 0 |
| 65.17689 | −51.0055 | 0 |
| 63.22296 | −50.9779 | 0 |
| 61.02274 | −50.9125 | 0 |
| 58.58028 | −50.7998 | 0 |
| 55.90264 | −50.6312 | 0 |
| 52.99965 | −50.3984 | 0 |
| 49.88361 | −50.0946 | 0 |
| 46.56907 | −49.7145 | 0 |
| 43.07247 | −49.2549 | 0 |
| 39.41185 | −48.7144 | 0 |
| 35.6067 | −48.0929 | 0 |
| 31.67747 | −47.3928 | 0 |
| 27.64527 | −46.6193 | 0 |
| 23.53163 | −45.7801 | 0 |
| 19.35831 | −44.8844 | 0 |
| 15.14727 | −43.9429 | 0 |
| 10.92013 | −42.9686 | 0 |
| 6.695939 | −41.9858 | 0 |
| 2.496585 | −41.006 | 0 |
| −1.66024 | −40.058 | 0 |
| −5.75542 | −39.1641 | 0 |
| −9.77098 | −38.3518 | 0 |
| −13.689 | −37.6509 | 0 |
| −17.4905 | −37.0914 | 0 |
| −21.1549 | −36.7017 | 0 |
| −24.6581 | −36.5053 | 0 |
| −27.974 | −36.518 | 0 |
| −31.0737 | −36.7443 | 0 |
| −33.9278 | −37.1755 | 0 |
| −36.51 | −37.7893 | 0 |
| −38.7994 | −38.5512 | 0 |
| −40.784 | −39.418 | 0 |
| −42.4604 | −40.3433 | 0 |
| −43.8341 | −41.2816 | 0 |
| −44.9181 | −42.1911 | 0 |
| −45.7323 | −43.0344 | 0 |
| −46.3038 | −43.7796 | 0 |
| −46.6684 | −44.3992 | 0 |
| −46.8725 | −44.8731 | 0 |
| −46.9545 | −40.4981 | 0.1 |
| −46.9798 | −40.7345 | 0.1 |
| −46.9823 | −41.0798 | 0.1 |
| −46.9234 | −41.6095 | 0.1 |
| −46.7485 | −42.3313 | 0.1 |
| −46.4063 | −43.239 | 0.1 |
| −45.855 | −44.3171 | 0.1 |
| −45.0595 | −45.5433 | 0.1 |
| −43.9904 | −46.8887 | 0.1 |
| −42.6237 | −48.3186 | 0.1 |
| −40.9413 | −49.793 | 0.1 |
| −38.9321 | −51.2681 | 0.1 |
| −36.5937 | −52.6992 | 0.1 |
| −33.9325 | −54.0441 | 0.1 |
| −30.964 | −55.2664 | 0.1 |
| −27.7107 | −56.3385 | 0.1 |
| −24.2003 | −57.2413 | 0.1 |
| −20.4632 | −57.9652 | 0.1 |
| −16.5313 | −58.5085 | 0.1 |
| −12.4362 | −58.8761 | 0.1 |
| −8.20885 | −59.0773 | 0.1 |
| −3.87918 | −59.1248 | 0.1 |
| 0.523985 | −59.0332 | 0.1 |
| 4.973153 | −58.8168 | 0.1 |
| 9.441318 | −58.49 | 0.1 |
| 13.90264 | −58.0696 | 0.1 |
| 18.33218 | −57.5723 | 0.1 |
| 22.7059 | −57.0143 | 0.1 |
| 27.00047 | −56.41 | 0.1 |
| 31.19342 | −55.7724 | 0.1 |
| 35.26353 | −55.1156 | 0.1 |
| 39.19065 | −54.452 | 0.1 |
| 42.95579 | −53.7931 | 0.1 |
| 46.54118 | −53.1476 | 0.1 |
| 49.93062 | −52.5241 | 0.1 |
| 53.10968 | −51.9301 | 0.1 |
| 56.06577 | −51.3715 | 0.1 |
| 58.78828 | −50.8529 | 0.1 |
| 61.26894 | −50.378 | 0.1 |
| 63.50193 | −49.9491 | 0.1 |
| 65.48415 | −49.5678 | 0.1 |
| 67.21547 | −49.2346 | 0.1 |
| 68.69881 | −48.9492 | 0.1 |
| 69.94052 | −48.7104 | 0.1 |
| 70.95046 | −48.5163 | 0.1 |
| 71.72508 | −48.2907 | 0.1 |
| 72.13698 | −47.8481 | 0.1 |
| 72.27608 | −47.4523 | 0.1 |
| 72.29491 | −47.1878 | 0.1 |
| 72.27145 | −46.9854 | 0.1 |
| 72.21864 | −46.7955 | 0.1 |
| 72.10607 | −46.5651 | 0.1 |
| 71.83864 | −46.2597 | 0.1 |
| 71.30704 | −46.0159 | 0.1 |
| 70.52708 | −46.0207 | 0.1 |

TABLE 1-continued

| X | Y | Zadim |
|---|---|---|
| 69.53279 | −46.0561 | 0.1 |
| 68.30996 | −46.0871 | 0.1 |
| 66.84877 | −46.1069 | 0.1 |
| 65.14317 | −46.1073 | 0.1 |
| 63.19059 | −46.0794 | 0.1 |
| 60.99189 | −46.0136 | 0.1 |
| 58.55115 | −45.9005 | 0.1 |
| 55.87538 | −45.7313 | 0.1 |
| 52.97443 | −45.4979 | 0.1 |
| 49.86062 | −45.1934 | 0.1 |
| 46.54848 | −44.8126 | 0.1 |
| 43.05443 | −44.3522 | 0.1 |
| 39.39651 | −43.8108 | 0.1 |
| 35.5942 | −43.1882 | 0.1 |
| 31.66794 | −42.4871 | 0.1 |
| 27.63884 | −41.7125 | 0.1 |
| 23.52838 | −40.8721 | 0.1 |
| 19.35834 | −39.9751 | 0.1 |
| 15.15067 | −39.0321 | 0.1 |
| 10.92691 | −38.0563 | 0.1 |
| 6.706118 | −37.0721 | 0.1 |
| 2.510223 | −36.0905 | 0.1 |
| −1.64323 | −35.1409 | 0.1 |
| −5.7351 | −34.2453 | 0.1 |
| −9.74747 | −33.4314 | 0.1 |
| −13.6624 | −32.7289 | 0.1 |
| −17.4611 | −32.1681 | 0.1 |
| −21.1228 | −31.7773 | 0.1 |
| −24.6236 | −31.58 | 0.1 |
| −27.9372 | −31.5921 | 0.1 |
| −31.0348 | −31.8181 | 0.1 |
| −33.8869 | −32.2492 | 0.1 |
| −36.4671 | −32.8633 | 0.1 |
| −38.7547 | −33.6256 | 0.1 |
| −40.7373 | −34.4932 | 0.1 |
| −42.4116 | −35.4195 | 0.1 |
| −43.7832 | −36.3588 | 0.1 |
| −44.8652 | −37.2692 | 0.1 |
| −45.6774 | −38.1133 | 0.1 |
| −46.2472 | −38.8589 | 0.1 |
| −46.6106 | −39.4787 | 0.1 |
| −46.8139 | −39.9526 | 0.1 |
| −46.8827 | −35.5808 | 0.2 |
| −46.9079 | −35.8169 | 0.2 |
| −46.9106 | −36.1619 | 0.2 |
| −46.8524 | −36.6912 | 0.2 |
| −46.6787 | −37.4125 | 0.2 |
| −46.3385 | −38.32 | 0.2 |
| −45.7898 | −39.3982 | 0.2 |
| −44.9975 | −40.6249 | 0.2 |
| −43.9323 | −41.9713 | 0.2 |
| −42.5699 | −43.4028 | 0.2 |
| −40.892 | −44.8792 | 0.2 |
| −38.8875 | −46.3567 | 0.2 |
| −36.5537 | −47.7905 | 0.2 |
| −33.897 | −49.138 | 0.2 |
| −30.9327 | −50.363 | 0.2 |
| −27.6836 | −51.4374 | 0.2 |
| −24.1771 | −52.3421 | 0.2 |
| −20.4439 | −53.0674 | 0.2 |
| −16.5158 | −53.6117 | 0.2 |
| −12.4246 | −53.9797 | 0.2 |
| −8.20118 | −54.1811 | 0.2 |
| −3.87552 | −54.2283 | 0.2 |
| 0.523554 | −54.1363 | 0.2 |
| 4.968556 | −53.9193 | 0.2 |
| 9.432507 | −53.5918 | 0.2 |
| 13.88958 | −53.1706 | 0.2 |
| 18.31487 | −52.6725 | 0.2 |
| 22.68435 | −52.1137 | 0.2 |
| 26.97477 | −51.5087 | 0.2 |
| 31.16364 | −50.8704 | 0.2 |
| 35.22976 | −50.2129 | 0.2 |
| 39.15304 | −49.5488 | 0.2 |
| 42.9145 | −48.8893 | 0.2 |
| 46.49638 | −48.2435 | 0.2 |
| 49.88251 | −47.6197 | 0.2 |
| 53.05848 | −47.0254 | 0.2 |
| 56.01169 | −46.4666 | 0.2 |
| 58.73156 | −45.9479 | 0.2 |
| 61.20982 | −45.4729 | 0.2 |
| 63.44066 | −45.044 | 0.2 |
| 65.42097 | −44.6626 | 0.2 |
| 67.15062 | −44.3294 | 0.2 |
| 68.63255 | −44.0441 | 0.2 |
| 69.87307 | −43.8053 | 0.2 |
| 70.88205 | −43.6112 | 0.2 |
| 71.65617 | −43.3866 | 0.2 |
| 72.06887 | −42.9456 | 0.2 |
| 72.20815 | −42.5503 | 0.2 |
| 72.22703 | −42.286 | 0.2 |
| 72.20359 | −42.0838 | 0.2 |
| 72.15078 | −41.8941 | 0.2 |
| 72.03821 | −41.664 | 0.2 |
| 71.77074 | −41.3592 | 0.2 |
| 71.23908 | −41.117 | 0.2 |
| 70.45992 | −41.1221 | 0.2 |
| 69.46665 | −41.1574 | 0.2 |
| 68.24509 | −41.1883 | 0.2 |
| 66.78542 | −41.2079 | 0.2 |
| 65.0816 | −41.2082 | 0.2 |
| 63.13106 | −41.1799 | 0.2 |
| 60.93467 | −41.1138 | 0.2 |
| 58.49648 | −41.0002 | 0.2 |
| 55.82354 | −40.8306 | 0.2 |
| 52.92567 | −40.5966 | 0.2 |
| 49.8152 | −40.2915 | 0.2 |
| 46.50663 | −39.9099 | 0.2 |
| 43.01638 | −39.4487 | 0.2 |
| 39.36248 | −38.9064 | 0.2 |
| 35.56439 | −38.2829 | 0.2 |
| 31.64253 | −37.5807 | 0.2 |
| 27.618 | −36.8049 | 0.2 |
| 23.51225 | −35.9632 | 0.2 |
| 19.34702 | −35.0649 | 0.2 |
| 15.14428 | −34.1204 | 0.2 |
| 10.92546 | −33.1434 | 0.2 |
| 6.709622 | −32.1577 | 0.2 |
| 2.518705 | −31.1745 | 0.2 |
| −1.62988 | −30.2235 | 0.2 |
| −5.71697 | −29.3265 | 0.2 |
| −9.72474 | −28.5114 | 0.2 |
| −13.6353 | −27.8079 | 0.2 |
| −17.4299 | −27.2462 | 0.2 |
| −21.0876 | −26.8549 | 0.2 |
| −24.5847 | −26.6573 | 0.2 |
| −27.8949 | −26.6695 | 0.2 |
| −30.9893 | −26.8958 | 0.2 |
| −33.8382 | −27.3275 | 0.2 |
| −36.4154 | −27.9423 | 0.2 |
| −38.7001 | −28.7054 | 0.2 |
| −40.6799 | −29.5738 | 0.2 |
| −42.3515 | −30.501 | 0.2 |
| −43.7204 | −31.4411 | 0.2 |
| −44.7999 | −32.3521 | 0.2 |
| −45.61 | −33.1967 | 0.2 |
| −46.178 | −33.9424 | 0.2 |
| −46.5401 | −34.5621 | 0.2 |
| −46.7426 | −35.0357 | 0.2 |
| −46.8094 | −30.6639 | 0.3 |
| −46.8346 | −30.8998 | 0.3 |
| −46.8375 | −31.2445 | 0.3 |
| −46.7798 | −31.7733 | 0.3 |
| −46.6073 | −32.4942 | 0.3 |
| −46.2689 | −33.4013 | 0.3 |
| −45.7228 | −34.4795 | 0.3 |
| −44.9337 | −35.7066 | 0.3 |
| −43.8722 | −37.0538 | 0.3 |
| −42.5141 | −38.4867 | 0.3 |
| −40.8408 | −39.965 | 0.3 |
| −38.841 | −41.4448 | 0.3 |
| −36.5119 | −42.8811 | 0.3 |
| −33.8599 | −44.2313 | 0.3 |
| −30.9001 | −45.4588 | 0.3 |
| −27.6552 | −46.5356 | 0.3 |
| −24.1529 | −47.4423 | 0.3 |

TABLE 1-continued

| X | Y | Zadim |
|---|---|---|
| −20.4239 | −48.1697 | 0.3 |
| −16.4998 | −48.7144 | 0.3 |
| −12.4126 | −49.0829 | 0.3 |
| −8.1934 | −49.2844 | 0.3 |
| −3.87197 | −49.3315 | 0.3 |
| 0.522782 | −49.239 | 0.3 |
| 4.963395 | −49.0214 | 0.3 |
| 9.422901 | −48.6932 | 0.3 |
| 13.87549 | −48.2712 | 0.3 |
| 18.2963 | −47.7722 | 0.3 |
| 22.66134 | −47.2126 | 0.3 |
| 26.94736 | −46.6068 | 0.3 |
| 31.13193 | −45.9679 | 0.3 |
| 35.19387 | −45.3097 | 0.3 |
| 39.11311 | −44.6451 | 0.3 |
| 42.87069 | −43.9851 | 0.3 |
| 46.44889 | −43.3389 | 0.3 |
| 49.83153 | −42.7148 | 0.3 |
| 53.00424 | −42.1202 | 0.3 |
| 55.95442 | −41.5613 | 0.3 |
| 58.67152 | −41.0425 | 0.3 |
| 61.14725 | −40.5675 | 0.3 |
| 63.37582 | −40.1385 | 0.3 |
| 65.35413 | −39.7572 | 0.3 |
| 67.08203 | −39.424 | 0.3 |
| 68.56246 | −39.1387 | 0.3 |
| 69.80173 | −38.9 | 0.3 |
| 70.80968 | −38.706 | 0.3 |
| 71.58325 | −38.4823 | 0.3 |
| 71.99675 | −38.0428 | 0.3 |
| 72.13625 | −37.648 | 0.3 |
| 72.15523 | −37.384 | 0.3 |
| 72.13186 | −37.182 | 0.3 |
| 72.07909 | −36.9925 | 0.3 |
| 71.96656 | −36.7627 | 0.3 |
| 71.69912 | −36.4585 | 0.3 |
| 71.16739 | −36.218 | 0.3 |
| 70.38907 | −36.2233 | 0.3 |
| 69.39689 | −36.2585 | 0.3 |
| 68.17664 | −36.2893 | 0.3 |
| 66.71854 | −36.3088 | 0.3 |
| 65.01656 | −36.3088 | 0.3 |
| 63.06813 | −36.2802 | 0.3 |
| 60.87412 | −36.2137 | 0.3 |
| 58.43859 | −36.0998 | 0.3 |
| 55.76858 | −35.9296 | 0.3 |
| 52.87391 | −35.6951 | 0.3 |
| 49.76689 | −35.3893 | 0.3 |
| 46.46202 | −35.007 | 0.3 |
| 42.97572 | −34.545 | 0.3 |
| 39.32598 | −34.0018 | 0.3 |
| 35.53227 | −33.3773 | 0.3 |
| 31.61497 | −32.6741 | 0.3 |
| 27.59517 | −31.8972 | 0.3 |
| 23.49429 | −31.0543 | 0.3 |
| 19.33407 | −30.1546 | 0.3 |
| 15.13643 | −29.2086 | 0.3 |
| 10.92272 | −28.2303 | 0.3 |
| 6.711999 | −27.2432 | 0.3 |
| 2.526222 | −26.2585 | 0.3 |
| −1.61731 | −25.306 | 0.3 |
| −5.69948 | −24.4077 | 0.3 |
| −9.7025 | −23.5913 | 0.3 |
| −13.6085 | −22.8868 | 0.3 |
| −17.3988 | −22.3244 | 0.3 |
| −21.0524 | −21.9325 | 0.3 |
| −24.5458 | −21.7348 | 0.3 |
| −27.8524 | −21.747 | 0.3 |
| −30.9433 | −21.9737 | 0.3 |
| −33.7891 | −22.406 | 0.3 |
| −36.3632 | −23.0215 | 0.3 |
| −38.6448 | −23.7855 | 0.3 |
| −40.6216 | −24.6548 | 0.3 |
| −42.2904 | −25.5829 | 0.3 |
| −43.6566 | −26.5239 | 0.3 |
| −44.7335 | −27.4355 | 0.3 |
| −45.5413 | −28.2805 | 0.3 |
| −46.1075 | −29.0263 | 0.3 |

TABLE 1-continued

| X | Y | Zadim |
|---|---|---|
| −46.4682 | −29.646 | 0.3 |
| −46.6698 | −30.1193 | 0.3 |
| −46.7277 | −25.749 | 0.4 |
| −46.7529 | −25.9846 | 0.4 |
| −46.756 | −26.3288 | 0.4 |
| −46.699 | −26.857 | 0.4 |
| −46.5277 | −27.5773 | 0.4 |
| −46.1913 | −28.4838 | 0.4 |
| −45.6478 | −29.5617 | 0.4 |
| −44.8621 | −30.7887 | 0.4 |
| −43.8046 | −32.1363 | 0.4 |
| −42.4506 | −33.5698 | 0.4 |
| −40.782 | −35.0491 | 0.4 |
| −38.7873 | −36.5304 | 0.4 |
| −36.4634 | −37.9687 | 0.4 |
| −33.8167 | −39.3212 | 0.4 |
| −30.8623 | −40.5512 | 0.4 |
| −27.6227 | −41.6303 | 0.4 |
| −24.1257 | −42.5392 | 0.4 |
| −20.4017 | −43.2675 | 0.4 |
| −16.4829 | −43.8147 | 0.4 |
| −12.4011 | −44.1844 | 0.4 |
| −8.18719 | −44.3871 | 0.4 |
| −3.87119 | −44.4344 | 0.4 |
| 0.518055 | −44.3417 | 0.4 |
| 4.953075 | −44.1239 | 0.4 |
| 9.406938 | −43.7954 | 0.4 |
| 13.85385 | −43.3729 | 0.4 |
| 18.26898 | −42.8733 | 0.4 |
| 22.62837 | −42.3131 | 0.4 |
| 26.90881 | −41.7066 | 0.4 |
| 31.08791 | −41.0669 | 0.4 |
| 35.14451 | −40.408 | 0.4 |
| 39.05857 | −39.7427 | 0.4 |
| 42.8112 | −39.0822 | 0.4 |
| 46.38467 | −38.4354 | 0.4 |
| 49.76285 | −37.8109 | 0.4 |
| 52.93137 | −37.216 | 0.4 |
| 55.87766 | −36.6567 | 0.4 |
| 58.59118 | −36.1377 | 0.4 |
| 61.06367 | −35.6625 | 0.4 |
| 63.28931 | −35.2335 | 0.4 |
| 65.26505 | −34.852 | 0.4 |
| 66.99068 | −34.5188 | 0.4 |
| 68.46918 | −34.2334 | 0.4 |
| 69.70684 | −33.9947 | 0.4 |
| 70.71349 | −33.8007 | 0.4 |
| 71.48624 | −33.5779 | 0.4 |
| 71.90005 | −33.1398 | 0.4 |
| 72.0394 | −32.7455 | 0.4 |
| 72.05827 | −32.4818 | 0.4 |
| 72.03484 | −32.2801 | 0.4 |
| 71.98205 | −32.0909 | 0.4 |
| 71.86953 | −31.8614 | 0.4 |
| 71.60223 | −31.5579 | 0.4 |
| 71.07073 | −31.3188 | 0.4 |
| 70.29347 | −31.3243 | 0.4 |
| 69.30265 | −31.3594 | 0.4 |
| 68.08408 | −31.3901 | 0.4 |
| 66.62798 | −31.4094 | 0.4 |
| 64.92831 | −31.4092 | 0.4 |
| 62.98257 | −31.3804 | 0.4 |
| 60.79158 | −31.3135 | 0.4 |
| 58.35941 | −31.1991 | 0.4 |
| 55.69311 | −31.0285 | 0.4 |
| 52.80248 | −30.7933 | 0.4 |
| 49.69983 | −30.4869 | 0.4 |
| 46.39964 | −30.1038 | 0.4 |
| 42.91831 | −29.641 | 0.4 |
| 39.27383 | −29.0968 | 0.4 |
| 35.48563 | −28.4713 | 0.4 |
| 31.57408 | −27.7669 | 0.4 |
| 27.56023 | −26.9887 | 0.4 |
| 23.46548 | −26.1445 | 0.4 |
| 19.31152 | −25.2435 | 0.4 |
| 15.1203 | −24.2959 | 0.4 |
| 10.91298 | −23.3161 | 0.4 |
| 6.708727 | −22.3275 | 0.4 |

TABLE 1-continued

| X | Y | Zadim |
|---|---|---|
| 2.529263 | −21.3416 | 0.4 |
| −1.60799 | −20.3879 | 0.4 |
| −5.68407 | −19.4885 | 0.4 |
| −9.68122 | −18.6714 | 0.4 |
| −13.5816 | −17.9664 | 0.4 |
| −17.3665 | −17.4039 | 0.4 |
| −21.0152 | −17.0123 | 0.4 |
| −24.5038 | −16.8152 | 0.4 |
| −27.8058 | −16.8283 | 0.4 |
| −30.8925 | −17.0561 | 0.4 |
| −33.7341 | −17.4895 | 0.4 |
| −36.3041 | −18.106 | 0.4 |
| −38.582 | −18.8708 | 0.4 |
| −40.5553 | −19.7408 | 0.4 |
| −42.2208 | −20.6694 | 0.4 |
| −43.584 | −21.6107 | 0.4 |
| −44.6583 | −22.5225 | 0.4 |
| −45.4639 | −23.3674 | 0.4 |
| −46.0283 | −24.113 | 0.4 |
| −46.3877 | −24.7322 | 0.4 |
| −46.5886 | −25.2051 | 0.4 |
| −46.588 | −20.8458 | 0.5 |
| −46.6135 | −21.0808 | 0.5 |
| −46.6172 | −21.4242 | 0.5 |
| −46.5615 | −21.9512 | 0.5 |
| −46.3923 | −22.67 | 0.5 |
| −46.0588 | −23.5751 | 0.5 |
| −45.5191 | −24.6514 | 0.5 |
| −44.7382 | −25.8771 | 0.5 |
| −43.6862 | −27.2236 | 0.5 |
| −42.3386 | −28.6563 | 0.5 |
| −40.6771 | −30.1352 | 0.5 |
| −38.6902 | −31.6165 | 0.5 |
| −36.3747 | −33.0554 | 0.5 |
| −33.737 | −34.4092 | 0.5 |
| −30.792 | −35.6408 | 0.5 |
| −27.5622 | −36.7221 | 0.5 |
| −24.0751 | −37.6334 | 0.5 |
| −20.3614 | −38.3646 | 0.5 |
| −16.453 | −38.9136 | 0.5 |
| −12.3816 | −39.2851 | 0.5 |
| −8.17835 | −39.4889 | 0.5 |
| −3.87319 | −39.5383 | 0.5 |
| 0.505048 | −39.4468 | 0.5 |
| 4.928946 | −39.2296 | 0.5 |
| 9.371605 | −38.9015 | 0.5 |
| 13.8072 | −38.4784 | 0.5 |
| 18.21098 | −37.9777 | 0.5 |
| 22.55904 | −37.4158 | 0.5 |
| 26.82827 | −36.8075 | 0.5 |
| 30.99632 | −36.1658 | 0.5 |
| 35.0421 | −35.5046 | 0.5 |
| 38.94563 | −34.8368 | 0.5 |
| 42.68806 | −34.1735 | 0.5 |
| 46.25175 | −33.5239 | 0.5 |
| 49.62062 | −32.8964 | 0.5 |
| 52.78035 | −32.2985 | 0.5 |
| 55.71841 | −31.7363 | 0.5 |
| 58.42433 | −31.2145 | 0.5 |
| 60.88986 | −30.7365 | 0.5 |
| 63.10921 | −30.3049 | 0.5 |
| 65.07932 | −29.921 | 0.5 |
| 66.80005 | −29.5856 | 0.5 |
| 68.27433 | −29.2983 | 0.5 |
| 69.50845 | −29.058 | 0.5 |
| 70.51221 | −28.8626 | 0.5 |
| 71.28264 | −28.6391 | 0.5 |
| 71.6943 | −28.2009 | 0.5 |
| 71.83169 | −27.8071 | 0.5 |
| 71.84962 | −27.544 | 0.5 |
| 71.82571 | −27.3428 | 0.5 |
| 71.77274 | −27.1543 | 0.5 |
| 71.66038 | −26.9256 | 0.5 |
| 71.39404 | −26.6228 | 0.5 |
| 70.86385 | −26.3843 | 0.5 |
| 70.08881 | −26.3901 | 0.5 |
| 69.10084 | −26.4263 | 0.5 |
| 67.88573 | −26.4582 | 0.5 |
| 66.43377 | −26.4789 | 0.5 |
| 64.73892 | −26.4802 | 0.5 |
| 62.79864 | −26.453 | 0.5 |
| 60.6138 | −26.3878 | 0.5 |
| 58.18843 | −26.2751 | 0.5 |
| 55.52958 | −26.1061 | 0.5 |
| 52.64705 | −25.8726 | 0.5 |
| 49.5531 | −25.5675 | 0.5 |
| 46.26223 | −25.1857 | 0.5 |
| 42.79078 | −24.7238 | 0.5 |
| 39.15672 | −24.1803 | 0.5 |
| 35.37946 | −23.5551 | 0.5 |
| 31.47931 | −22.8507 | 0.5 |
| 27.47728 | −22.0723 | 0.5 |
| 23.3947 | −21.2276 | 0.5 |
| 19.25317 | −20.3259 | 0.5 |
| 15.07451 | −19.3777 | 0.5 |
| 10.88005 | −18.3966 | 0.5 |
| 6.688439 | −17.4075 | 0.5 |
| 2.521632 | −16.4208 | 0.5 |
| −1.60341 | −15.4675 | 0.5 |
| −5.66752 | −14.5686 | 0.5 |
| −9.65314 | −13.7526 | 0.5 |
| −13.5425 | −13.0495 | 0.5 |
| −17.3169 | −12.4897 | 0.5 |
| −20.9555 | −12.1014 | 0.5 |
| −24.4344 | −11.9081 | 0.5 |
| −27.7271 | −11.9254 | 0.5 |
| −30.8047 | −12.157 | 0.5 |
| −33.6375 | −12.5938 | 0.5 |
| −36.1993 | −13.2129 | 0.5 |
| −38.4695 | −13.9793 | 0.5 |
| −40.4359 | −14.8497 | 0.5 |
| −42.0955 | −15.7778 | 0.5 |
| −43.4539 | −16.7179 | 0.5 |
| −44.5244 | −17.628 | 0.5 |
| −45.3272 | −18.4709 | 0.5 |
| −45.8898 | −19.2146 | 0.5 |
| −46.2482 | −19.8321 | 0.5 |
| −46.4487 | −20.3036 | 0.5 |
| −45.9091 | −16.0974 | 0.6 |
| −45.9378 | −16.3293 | 0.6 |
| −45.9467 | −16.6688 | 0.6 |
| −45.8995 | −17.1907 | 0.6 |
| −45.7427 | −17.9039 | 0.6 |
| −45.4251 | −18.8032 | 0.6 |
| −44.9046 | −19.874 | 0.6 |
| −44.1456 | −21.0944 | 0.6 |
| −43.1185 | −22.436 | 0.6 |
| −41.7989 | −23.8647 | 0.6 |
| −40.1673 | −25.3398 | 0.6 |
| −38.2118 | −26.817 | 0.6 |
| −35.9291 | −28.2508 | 0.6 |
| −33.3254 | −29.5983 | 0.6 |
| −30.416 | −30.8225 | 0.6 |
| −27.2235 | −31.8953 | 0.6 |
| −23.7757 | −32.7976 | 0.6 |
| −20.1033 | −33.5195 | 0.6 |
| −16.238 | −34.0594 | 0.6 |
| −12.2118 | −34.4224 | 0.6 |
| −8.05511 | −34.6164 | 0.6 |
| −3.79795 | −34.6551 | 0.6 |
| 0.531096 | −34.5502 | 0.6 |
| 4.904878 | −34.3215 | 0.6 |
| 9.296611 | −33.9798 | 0.6 |
| 13.68084 | −33.5426 | 0.6 |
| 18.03298 | −33.0263 | 0.6 |
| 22.3294 | −32.4473 | 0.6 |
| 26.54723 | −31.8202 | 0.6 |
| 30.66442 | −31.1583 | 0.6 |
| 34.6602 | −30.4756 | 0.6 |
| 38.5149 | −29.7853 | 0.6 |
| 42.21001 | −29.099 | 0.6 |
| 45.7282 | −28.4261 | 0.6 |
| 49.05368 | −27.7754 | 0.6 |
| 52.17239 | −27.1547 | 0.6 |
| 55.07209 | −26.5704 | 0.6 |
| 57.74245 | −26.0274 | 0.6 |

TABLE 1-continued

| X | Y | Zadim |
|---|---|---|
| 60.17542 | −25.5296 | 0.6 |
| 62.36533 | −25.0795 | 0.6 |
| 64.30921 | −24.6788 | 0.6 |
| 66.00694 | −24.3284 | 0.6 |
| 67.46147 | −24.0279 | 0.6 |
| 68.67904 | −23.7764 | 0.6 |
| 69.66929 | −23.5718 | 0.6 |
| 70.42695 | −23.3365 | 0.6 |
| 70.82181 | −22.892 | 0.6 |
| 70.94645 | −22.499 | 0.6 |
| 70.9583 | −22.2386 | 0.6 |
| 70.93134 | −22.04 | 0.6 |
| 70.87704 | −21.8546 | 0.6 |
| 70.76539 | −21.6295 | 0.6 |
| 70.5051 | −21.3291 | 0.6 |
| 69.98491 | −21.0845 | 0.6 |
| 69.22045 | −21.0878 | 0.6 |
| 68.24609 | −21.1315 | 0.6 |
| 67.04765 | −21.1731 | 0.6 |
| 65.61546 | −21.2055 | 0.6 |
| 63.94349 | −21.2206 | 0.6 |
| 62.02919 | −21.2095 | 0.6 |
| 59.87331 | −21.1625 | 0.6 |
| 57.4798 | −21.0701 | 0.6 |
| 54.85555 | −20.9232 | 0.6 |
| 52.01023 | −20.7134 | 0.6 |
| 48.95596 | −20.4333 | 0.6 |
| 45.70707 | −20.0772 | 0.6 |
| 42.27976 | −19.6413 | 0.6 |
| 38.6919 | −19.1237 | 0.6 |
| 34.96274 | −18.5237 | 0.6 |
| 31.11246 | −17.8436 | 0.6 |
| 27.16188 | −17.0882 | 0.6 |
| 23.13218 | −16.2649 | 0.6 |
| 19.0448 | −15.3828 | 0.6 |
| 14.92128 | −14.4524 | 0.6 |
| 10.78192 | −13.4903 | 0.6 |
| 6.646409 | −12.5159 | 0.6 |
| 2.535683 | −11.5426 | 0.6 |
| −1.53401 | −10.6029 | 0.6 |
| −5.54363 | −9.71711 | 0.6 |
| −9.47623 | −8.91525 | 0.6 |
| −13.3143 | −8.22753 | 0.6 |
| −17.0393 | −7.68485 | 0.6 |
| −20.6304 | −7.31595 | 0.6 |
| −24.0634 | −7.14418 | 0.6 |
| −27.3116 | −7.18455 | 0.6 |
| −30.3457 | −7.43944 | 0.6 |
| −33.1361 | −7.89739 | 0.6 |
| −35.6573 | −8.53304 | 0.6 |
| −37.8899 | −9.30937 | 0.6 |
| −39.8234 | −10.1825 | 0.6 |
| −41.4559 | −11.1066 | 0.6 |
| −42.7936 | −12.0375 | 0.6 |
| −43.8498 | −12.9352 | 0.6 |
| −44.6441 | −13.7645 | 0.6 |
| −45.2032 | −14.4951 | 0.6 |
| −45.5618 | −15.1013 | 0.6 |
| −45.7646 | −15.5643 | 0.6 |
| −44.306 | −11.6745 | 0.7 |
| −44.3374 | −11.8998 | 0.7 |
| −44.3524 | −12.2301 | 0.7 |
| −44.318 | −12.7391 | 0.7 |
| −44.1829 | −13.437 | 0.7 |
| −43.8975 | −14.3206 | 0.7 |
| −43.4196 | −15.3766 | 0.7 |
| −42.7128 | −16.5841 | 0.7 |
| −41.7465 | −17.9153 | 0.7 |
| −40.4949 | −19.3359 | 0.7 |
| −38.9359 | −20.8039 | 0.7 |
| −37.0559 | −22.2728 | 0.7 |
| −34.8504 | −23.6949 | 0.7 |
| −32.3252 | −25.0251 | 0.7 |
| −29.4963 | −26.2253 | 0.7 |
| −26.3876 | −27.2673 | 0.7 |
| −23.0278 | −28.1331 | 0.7 |
| −19.4483 | −28.8138 | 0.7 |
| −15.6813 | −29.309 | 0.7 |
| −11.7584 | −29.6246 | 0.7 |
| −7.70992 | −29.7674 | 0.7 |
| −3.56533 | −29.755 | 0.7 |
| 0.64766 | −29.6033 | 0.7 |
| 4.902184 | −29.3219 | 0.7 |
| 9.172333 | −28.9267 | 0.7 |
| 13.43345 | −28.4354 | 0.7 |
| 17.66178 | −27.8649 | 0.7 |
| 21.83446 | −27.2313 | 0.7 |
| 25.92951 | −26.5501 | 0.7 |
| 29.92575 | −25.8352 | 0.7 |
| 33.80317 | −25.1007 | 0.7 |
| 37.54284 | −24.3598 | 0.7 |
| 41.12704 | −23.6246 | 0.7 |
| 44.53915 | −22.9051 | 0.7 |
| 47.76397 | −22.2102 | 0.7 |
| 50.78798 | −21.5478 | 0.7 |
| 53.59938 | −20.9244 | 0.7 |
| 56.18827 | −20.3453 | 0.7 |
| 58.54687 | −19.8142 | 0.7 |
| 60.66973 | −19.334 | 0.7 |
| 62.554 | −18.9062 | 0.7 |
| 64.19959 | −18.5319 | 0.7 |
| 65.60941 | −18.2108 | 0.7 |
| 66.78952 | −17.9419 | 0.7 |
| 67.74929 | −17.7231 | 0.7 |
| 68.47818 | −17.4669 | 0.7 |
| 68.84376 | −17.0185 | 0.7 |
| 68.952 | −16.6322 | 0.7 |
| 68.95732 | −16.3784 | 0.7 |
| 68.92786 | −16.1855 | 0.7 |
| 68.87345 | −16.0062 | 0.7 |
| 68.76495 | −15.788 | 0.7 |
| 68.51606 | −15.494 | 0.7 |
| 68.01734 | −15.2431 | 0.7 |
| 67.27609 | −15.2402 | 0.7 |
| 66.33192 | −15.298 | 0.7 |
| 65.17047 | −15.3581 | 0.7 |
| 63.78222 | −15.4137 | 0.7 |
| 62.16117 | −15.4574 | 0.7 |
| 60.30468 | −15.4804 | 0.7 |
| 58.21331 | −15.4733 | 0.7 |
| 55.89069 | −15.4267 | 0.7 |
| 53.34338 | −15.331 | 0.7 |
| 50.58062 | −15.1772 | 0.7 |
| 47.61414 | −14.9571 | 0.7 |
| 44.45788 | −14.6641 | 0.7 |
| 41.12773 | −14.2931 | 0.7 |
| 37.64124 | −13.8407 | 0.7 |
| 34.01734 | −13.3051 | 0.7 |
| 30.27593 | −12.6877 | 0.7 |
| 26.43754 | −11.9922 | 0.7 |
| 22.52305 | −11.225 | 0.7 |
| 18.55347 | −10.395 | 0.7 |
| 14.54976 | −9.51273 | 0.7 |
| 10.53169 | −8.59488 | 0.7 |
| 6.518653 | −7.65922 | 0.7 |
| 2.529913 | −6.72345 | 0.7 |
| −1.41814 | −5.81663 | 0.7 |
| −5.30761 | −4.96081 | 0.7 |
| −9.12266 | −4.18811 | 0.7 |
| −12.8465 | −3.52937 | 0.7 |
| −16.4612 | −3.01696 | 0.7 |
| −19.9463 | −2.68117 | 0.7 |
| −23.2772 | −2.54686 | 0.7 |
| −26.4268 | −2.62981 | 0.7 |
| −29.3643 | −2.93152 | 0.7 |
| −32.0597 | −3.43762 | 0.7 |
| −34.4878 | −4.11811 | 0.7 |
| −36.6312 | −4.93133 | 0.7 |
| −38.482 | −5.8302 | 0.7 |
| −40.0411 | −6.76779 | 0.7 |
| −41.3169 | −7.70081 | 0.7 |
| −42.3239 | −8.59138 | 0.7 |
| −43.0822 | −9.40719 | 0.7 |
| −43.6175 | −10.121 | 0.7 |
| −43.963 | −10.7102 | 0.7 |
| −44.1608 | −11.1588 | 0.7 |

TABLE 1-continued

| X | Y | Zadim |
|---|---|---|
| −42.0152 | −7.49713 | 0.8 |
| −42.0479 | −7.71337 | 0.8 |
| −42.068 | −8.03062 | 0.8 |
| −42.0472 | −8.52073 | 0.8 |
| −41.9392 | −9.19565 | 0.8 |
| −41.6972 | −10.055 | 0.8 |
| −41.2801 | −11.0884 | 0.8 |
| −40.6507 | −12.2773 | 0.8 |
| −39.7761 | −13.595 | 0.8 |
| −38.6269 | −15.0069 | 0.8 |
| −37.1776 | −16.4691 | 0.8 |
| −35.4102 | −17.9315 | 0.8 |
| −33.3177 | −19.3414 | 0.8 |
| −30.905 | −20.6487 | 0.8 |
| −28.1892 | −21.8123 | 0.8 |
| −25.1967 | −22.8035 | 0.8 |
| −21.9588 | −23.6058 | 0.8 |
| −18.5086 | −24.2134 | 0.8 |
| −14.8793 | −24.6288 | 0.8 |
| −11.1024 | −24.8603 | 0.8 |
| −7.20794 | −24.9173 | 0.8 |
| −3.2243 | −24.8174 | 0.8 |
| 0.82186 | −24.5763 | 0.8 |
| 4.904843 | −24.2082 | 0.8 |
| 9.000011 | −23.7284 | 0.8 |
| 13.08397 | −23.1544 | 0.8 |
| 17.13421 | −22.5032 | 0.8 |
| 21.12908 | −21.7907 | 0.8 |
| 25.0479 | −21.0331 | 0.8 |
| 28.87077 | −20.2449 | 0.8 |
| 32.57881 | −19.4403 | 0.8 |
| 36.15419 | −18.6326 | 0.8 |
| 39.5802 | −17.8339 | 0.8 |
| 42.8412 | −17.0547 | 0.8 |
| 45.92287 | −16.3042 | 0.8 |
| 48.81235 | −15.5899 | 0.8 |
| 51.49847 | −14.9186 | 0.8 |
| 53.97182 | −14.2954 | 0.8 |
| 56.22503 | −13.7242 | 0.8 |
| 58.25293 | −13.2076 | 0.8 |
| 60.0528 | −12.7474 | 0.8 |
| 61.62461 | −12.3445 | 0.8 |
| 62.97117 | −11.9989 | 0.8 |
| 64.09828 | −11.7093 | 0.8 |
| 65.01494 | −11.4736 | 0.8 |
| 65.70211 | −11.1906 | 0.8 |
| 66.02808 | −10.7406 | 0.8 |
| 66.11813 | −10.3654 | 0.8 |
| 66.11721 | −10.1213 | 0.8 |
| 66.08612 | −9.93633 | 0.8 |
| 66.03288 | −9.76516 | 0.8 |
| 65.92968 | −9.5561 | 0.8 |
| 65.69637 | −9.27103 | 0.8 |
| 65.22849 | −9.01255 | 0.8 |
| 64.51953 | −9.00129 | 0.8 |
| 63.61774 | −9.07738 | 0.8 |
| 62.50827 | −9.16187 | 0.8 |
| 61.18185 | −9.24857 | 0.8 |
| 59.63257 | −9.33079 | 0.8 |
| 57.85765 | −9.40046 | 0.8 |
| 55.85735 | −9.44854 | 0.8 |
| 53.63485 | −9.46566 | 0.8 |
| 51.19617 | −9.4419 | 0.8 |
| 48.54993 | −9.36729 | 0.8 |
| 45.70721 | −9.23244 | 0.8 |
| 42.68137 | −9.02925 | 0.8 |
| 39.48773 | −8.75086 | 0.8 |
| 36.14337 | −8.39172 | 0.8 |
| 32.66677 | −7.94856 | 0.8 |
| 29.07742 | −7.42096 | 0.8 |
| 25.3955 | −6.81109 | 0.8 |
| 21.64149 | −6.12419 | 0.8 |
| 17.83586 | −5.36847 | 0.8 |
| 13.99884 | −4.55479 | 0.8 |
| 10.14942 | −3.6998 | 0.8 |
| 6.306992 | −2.81782 | 0.8 |
| 2.487921 | −1.93517 | 0.8 |
| −1.2908 | −1.07419 | 0.8 |
| −5.01286 | −0.25954 | 0.8 |
| −8.66406 | 0.473636 | 0.8 |
| −12.2286 | 1.093548 | 0.8 |
| −15.6894 | 1.565722 | 0.8 |
| −19.0264 | 1.857339 | 0.8 |
| −22.2145 | 1.941145 | 0.8 |
| −25.2258 | 1.799776 | 0.8 |
| −28.0269 | 1.432493 | 0.8 |
| −30.587 | 0.857579 | 0.8 |
| −32.8812 | 0.111237 | 0.8 |
| −34.8946 | −0.75861 | 0.8 |
| −36.6231 | −1.70045 | 0.8 |
| −38.0716 | −2.66545 | 0.8 |
| −39.2519 | −3.61079 | 0.8 |
| −40.1805 | −4.50065 | 0.8 |
| −40.8785 | −5.30578 | 0.8 |
| −41.3715 | −6.00259 | 0.8 |
| −41.6911 | −6.57268 | 0.8 |
| −41.8758 | −7.00384 | 0.8 |
| −39.3021 | −3.46782 | 0.9 |
| −39.335 | −3.67368 | 0.9 |
| −39.3593 | −3.9757 | 0.9 |
| −39.3522 | −4.44327 | 0.9 |
| −39.2735 | −5.08998 | 0.9 |
| −39.0812 | −5.91888 | 0.9 |
| −38.7356 | −6.92336 | 0.9 |
| −38.1992 | −8.08799 | 0.9 |
| −37.4363 | −9.38819 | 0.9 |
| −36.4128 | −10.7894 | 0.9 |
| −35.0978 | −12.246 | 0.9 |
| −33.4678 | −13.7033 | 0.9 |
| −31.5113 | −15.1021 | 0.9 |
| −29.2322 | −16.3856 | 0.9 |
| −26.6493 | −17.5079 | 0.9 |
| −23.7923 | −18.4387 | 0.9 |
| −20.6964 | −19.1634 | 0.9 |
| −17.3974 | −19.6798 | 0.9 |
| −13.9296 | −19.9943 | 0.9 |
| −10.3249 | −20.1184 | 0.9 |
| −6.61284 | −20.0648 | 0.9 |
| −2.82041 | −19.8534 | 0.9 |
| 1.026958 | −19.5002 | 0.9 |
| 4.905134 | −19.0216 | 0.9 |
| 8.791224 | −18.435 | 0.9 |
| 12.66348 | −17.758 | 0.9 |
| 16.5009 | −17.0072 | 0.9 |
| 20.28332 | −16.1985 | 0.9 |
| 23.99166 | −15.3486 | 0.9 |
| 27.60768 | −14.4731 | 0.9 |
| 31.11393 | −13.5863 | 0.9 |
| 34.4938 | −12.7011 | 0.9 |
| 37.7318 | −11.83 | 0.9 |
| 40.81351 | −10.9837 | 0.9 |
| 43.72555 | −10.1713 | 0.9 |
| 46.45584 | −9.40025 | 0.9 |
| 48.99389 | −8.67697 | 0.9 |
| 51.33084 | −8.00649 | 0.9 |
| 53.45972 | −7.3925 | 0.9 |
| 55.37567 | −6.83764 | 0.9 |
| 57.07609 | −6.34348 | 0.9 |
| 58.561 | −5.91087 | 0.9 |
| 59.83306 | −5.53963 | 0.9 |
| 60.89781 | −5.22868 | 0.9 |
| 61.76369 | −4.9755 | 0.9 |
| 62.39997 | −4.66308 | 0.9 |
| 62.68069 | −4.21499 | 0.9 |
| 62.75267 | −3.85422 | 0.9 |
| 62.74635 | −3.62157 | 0.9 |
| 62.71447 | −3.44567 | 0.9 |
| 62.66335 | −3.2837 | 0.9 |
| 62.56684 | −3.08499 | 0.9 |
| 62.35152 | −2.81033 | 0.9 |
| 61.92078 | −2.54411 | 0.9 |
| 61.24939 | −2.52358 | 0.9 |
| 60.39741 | −2.61999 | 0.9 |
| 59.34916 | −2.7317 | 0.9 |
| 58.09571 | −2.85351 | 0.9 |
| 56.63126 | −2.97977 | 0.9 |

TABLE 1-continued

| X | Y | Zadim |
|---|---|---|
| 54.9529 | −3.10323 | 0.9 |
| 53.06055 | −3.21538 | 0.9 |
| 50.95686 | −3.30704 | 0.9 |
| 48.64708 | −3.36776 | 0.9 |
| 46.13904 | −3.38656 | 0.9 |
| 43.44299 | −3.35257 | 0.9 |
| 40.57142 | −3.25589 | 0.9 |
| 37.53891 | −3.08729 | 0.9 |
| 34.36189 | −2.83873 | 0.9 |
| 31.05826 | −2.50491 | 0.9 |
| 27.64704 | −2.08336 | 0.9 |
| 24.14803 | −1.57425 | 0.9 |
| 20.5813 | −0.98137 | 0.9 |
| 16.96675 | −0.31246 | 0.9 |
| 13.32376 | 0.421144 | 0.9 |
| 9.670525 | 1.202599 | 0.9 |
| 6.026706 | 2.023137 | 0.9 |
| 2.405322 | 2.845773 | 0.9 |
| −1.17634 | 3.65429 | 0.9 |
| −4.70366 | 4.421687 | 0.9 |
| −8.16425 | 5.10953 | 0.9 |
| −11.5434 | 5.684763 | 0.9 |
| −14.8253 | 6.109977 | 0.9 |
| −17.9896 | 6.349073 | 0.9 |
| −21.0113 | 6.37156 | 0.9 |
| −23.8595 | 6.158598 | 0.9 |
| −26.4985 | 5.710967 | 0.9 |
| −28.8953 | 5.051654 | 0.9 |
| −31.026 | 4.224627 | 0.9 |
| −32.8795 | 3.285257 | 0.9 |
| −34.4567 | 2.290167 | 0.9 |
| −35.768 | 1.290358 | 0.9 |
| −36.8292 | 0.327937 | 0.9 |
| −37.6597 | −0.56376 | 0.9 |
| −38.2817 | −1.35898 | 0.9 |
| −38.7205 | −2.03825 | 0.9 |
| −39.0059 | −2.58771 | 0.9 |
| −39.1726 | −2.99967 | 0.9 |
| −36.4086 | 0.497467 | 1 |
| −36.4407 | 0.30233 | 1 |
| −36.4681 | 0.016217 | 1 |
| −36.4737 | −0.4274 | 1 |
| −36.4242 | −1.04343 | 1 |
| −36.2828 | −1.83819 | 1 |
| −36.0126 | −2.80902 | 1 |
| −35.5761 | −3.94435 | 1 |
| −34.9348 | −5.22259 | 1 |
| −34.0496 | −6.61035 | 1 |
| −32.8831 | −8.06119 | 1 |
| −31.4049 | −9.51627 | 1 |
| −29.5976 | −10.9088 | 1 |
| −27.4625 | −12.1732 | 1 |
| −25.0202 | −13.2563 | 1 |
| −22.3051 | −14.1246 | 1 |
| −19.3574 | −14.7648 | 1 |
| −16.2168 | −15.1789 | 1 |
| −12.9196 | −15.3787 | 1 |
| −9.49795 | −15.3796 | 1 |
| −5.98057 | −15.2022 | 1 |
| −2.39322 | −14.8629 | 1 |
| 1.240315 | −14.3821 | 1 |
| 4.897901 | −13.7789 | 1 |
| 8.558777 | −13.0728 | 1 |
| 12.20309 | −12.2817 | 1 |
| 15.81154 | −11.4221 | 1 |
| 19.36563 | −10.5097 | 1 |
| 22.84803 | −9.56156 | 1 |
| 26.24237 | −8.59418 | 1 |
| 29.53278 | −7.62212 | 1 |
| 32.70393 | −6.65797 | 1 |
| 35.74155 | −5.71373 | 1 |
| 38.63244 | −4.80038 | 1 |
| 41.36425 | −3.927 | 1 |
| 43.92564 | −3.10053 | 1 |
| 46.3067 | −2.32688 | 1 |
| 48.49915 | −1.61083 | 1 |
| 50.4964 | −0.95586 | 1 |
| 52.29385 | −0.36439 | 1 |
| 53.88906 | 0.162185 | 1 |
| 55.28202 | 0.62313 | 1 |
| 56.47525 | 1.018687 | 1 |
| 57.47402 | 1.349989 | 1 |
| 58.28619 | 1.619809 | 1 |
| 58.86579 | 1.961709 | 1 |
| 59.09948 | 2.404575 | 1 |
| 59.15424 | 2.749405 | 1 |
| 59.14321 | 2.969971 | 1 |
| 59.11111 | 3.136467 | 1 |
| 59.06263 | 3.288947 | 1 |
| 58.97343 | 3.477028 | 1 |
| 58.77706 | 3.740879 | 1 |
| 58.38688 | 4.014461 | 1 |
| 57.7548 | 4.045007 | 1 |
| 56.95555 | 3.928018 | 1 |
| 55.97226 | 3.788699 | 1 |
| 54.79639 | 3.630962 | 1 |
| 53.42233 | 3.459356 | 1 |
| 51.84708 | 3.280195 | 1 |
| 50.07019 | 3.101339 | 1 |
| 48.09373 | 2.931731 | 1 |
| 45.92215 | 2.782292 | 1 |
| 43.56223 | 2.665074 | 1 |
| 41.02319 | 2.592467 | 1 |
| 38.31649 | 2.576338 | 1 |
| 35.45569 | 2.628575 | 1 |
| 32.45643 | 2.759852 | 1 |
| 29.33593 | 2.977765 | 1 |
| 26.11269 | 3.287169 | 1 |
| 22.80612 | 3.690119 | 1 |
| 19.43594 | 4.184309 | 1 |
| 16.02154 | 4.762379 | 1 |
| 12.58149 | 5.411989 | 1 |
| 9.133774 | 6.119045 | 1 |
| 5.696663 | 6.872373 | 1 |
| 2.282418 | 7.635634 | 1 |
| −1.09354 | 8.389413 | 1 |
| −4.41745 | 9.108172 | 1 |
| −7.67905 | 9.748746 | 1 |
| −10.8649 | 10.27653 | 1 |
| −13.96 | 10.65093 | 1 |
| −16.9438 | 10.83206 | 1 |
| −19.7904 | 10.78548 | 1 |
| −22.465 | 10.49025 | 1 |
| −24.9282 | 9.950354 | 1 |
| −27.1452 | 9.196094 | 1 |
| −29.094 | 8.280497 | 1 |
| −30.7684 | 7.266708 | 1 |
| −32.1763 | 6.215878 | 1 |
| −33.3341 | 5.180107 | 1 |
| −34.2623 | 4.200328 | 1 |
| −34.9831 | 3.306948 | 1 |
| −35.5201 | 2.522015 | 1 |
| −35.8984 | 1.860726 | 1 |
| −36.1454 | 1.332299 | 1 |
| −36.2914 | 0.939898 | 1 |
| −33.4949 | 4.462218 | 1.1 |
| −33.5262 | 4.277618 | 1.1 |
| −33.5564 | 4.00723 | 1.1 |
| −33.5741 | 3.58758 | 1.1 |
| −33.5529 | 3.002896 | 1.1 |
| −33.4617 | 2.24417 | 1.1 |
| −33.2667 | 1.310331 | 1.1 |
| −32.9311 | 0.208877 | 1.1 |
| −32.4144 | −1.04243 | 1.1 |
| −31.6729 | −2.41294 | 1.1 |
| −30.6622 | −3.85662 | 1.1 |
| −29.343 | −5.31109 | 1.1 |
| −27.6903 | −6.70167 | 1.1 |
| −25.7022 | −7.95278 | 1.1 |
| −23.4009 | −9.00212 | 1.1 |
| −20.8265 | −9.8116 | 1.1 |
| −18.0257 | −10.3687 | 1.1 |
| −15.043 | −10.6801 | 1.1 |
| −11.9168 | −10.763 | 1.1 |
| −8.68027 | −10.639 | 1.1 |
| −5.36039 | −10.3304 | 1.1 |

TABLE 1-continued

| X | Y | Zadim |
|---|---|---|
| −1.98173 | −9.86011 | 1.1 |
| 1.43394 | −9.24974 | 1.1 |
| 4.866575 | −8.52011 | 1.1 |
| 8.297563 | −7.69181 | 1.1 |
| 11.70932 | −6.78454 | 1.1 |
| 15.08436 | −5.81465 | 1.1 |
| 18.40573 | −4.79734 | 1.1 |
| 21.65789 | −3.74977 | 1.1 |
| 24.82638 | −2.68915 | 1.1 |
| 27.8971 | −1.63065 | 1.1 |
| 30.85593 | −0.58624 | 1.1 |
| 33.68979 | 0.432378 | 1.1 |
| 36.38673 | 1.414114 | 1.1 |
| 38.93549 | 2.349855 | 1.1 |
| 41.32541 | 3.233071 | 1.1 |
| 43.54719 | 4.058337 | 1.1 |
| 45.59305 | 4.821099 | 1.1 |
| 47.4568 | 5.518132 | 1.1 |
| 49.13407 | 6.147213 | 1.1 |
| 50.62254 | 6.707111 | 1.1 |
| 51.92221 | 7.197226 | 1.1 |
| 53.03545 | 7.617835 | 1.1 |
| 53.96725 | 7.970109 | 1.1 |
| 54.72489 | 8.257112 | 1.1 |
| 55.24298 | 8.628481 | 1.1 |
| 55.42916 | 9.063668 | 1.1 |
| 55.4669 | 9.392193 | 1.1 |
| 55.45132 | 9.600733 | 1.1 |
| 55.41909 | 9.757948 | 1.1 |
| 55.37334 | 9.901061 | 1.1 |
| 55.29155 | 10.07864 | 1.1 |
| 55.1144 | 10.33187 | 1.1 |
| 54.76632 | 10.61179 | 1.1 |
| 54.17347 | 10.65231 | 1.1 |
| 53.42762 | 10.51401 | 1.1 |
| 52.51028 | 10.34614 | 1.1 |
| 51.41339 | 10.15125 | 1.1 |
| 50.13157 | 9.932765 | 1.1 |
| 48.66175 | 9.69608 | 1.1 |
| 47.00316 | 9.448407 | 1.1 |
| 45.15723 | 9.198486 | 1.1 |
| 43.12743 | 8.95778 | 1.1 |
| 40.91944 | 8.73947 | 1.1 |
| 38.54115 | 8.557572 | 1.1 |
| 36.00282 | 8.426095 | 1.1 |
| 33.31684 | 8.359795 | 1.1 |
| 30.49777 | 8.372101 | 1.1 |
| 27.56209 | 8.4731 | 1.1 |
| 24.52784 | 8.670215 | 1.1 |
| 21.41409 | 8.967806 | 1.1 |
| 18.24028 | 9.364842 | 1.1 |
| 15.02543 | 9.85401 | 1.1 |
| 11.78746 | 10.42195 | 1.1 |
| 8.544319 | 11.05781 | 1.1 |
| 5.312862 | 11.74715 | 1.1 |
| 2.104175 | 12.45215 | 1.1 |
| −1.06685 | 13.15599 | 1.1 |
| −4.18941 | 13.82487 | 1.1 |
| −7.25377 | 14.4182 | 1.1 |
| −10.2483 | 14.89616 | 1.1 |
| −13.1587 | 15.21449 | 1.1 |
| −15.9631 | 15.32924 | 1.1 |
| −18.634 | 15.20257 | 1.1 |
| −21.1307 | 14.81403 | 1.1 |
| −23.4097 | 14.17127 | 1.1 |
| −25.435 | 13.31475 | 1.1 |
| −27.1883 | 12.30805 | 1.1 |
| −28.6709 | 11.22159 | 1.1 |
| −29.8985 | 10.1196 | 1.1 |
| −30.8946 | 9.053948 | 1.1 |
| −31.6838 | 8.062367 | 1.1 |
| −32.291 | 7.171709 | 1.1 |
| −32.7406 | 6.400117 | 1.1 |
| −33.0572 | 5.75856 | 1.1 |
| −33.2653 | 5.251886 | 1.1 |
| −33.3904 | 4.879157 | 1.1 |
| −30.6218 | 8.457526 | 1.2 |
| −30.652 | 8.283044 | 1.2 |
| −30.6848 | 8.027796 | 1.2 |
| −30.7138 | 7.631605 | 1.2 |
| −30.7193 | 7.078174 | 1.2 |
| −30.6761 | 6.356721 | 1.2 |
| −30.5535 | 5.46278 | 1.2 |
| −30.316 | 4.399905 | 1.2 |
| −29.9223 | 3.181514 | 1.2 |
| −29.3248 | 1.834239 | 1.2 |
| −28.4726 | 0.401834 | 1.2 |
| −27.3172 | −1.05217 | 1.2 |
| −25.8244 | −2.44667 | 1.2 |
| −23.986 | −3.69442 | 1.2 |
| −21.8252 | −4.72116 | 1.2 |
| −19.3885 | −5.48162 | 1.2 |
| −16.7305 | −5.96279 | 1.2 |
| −13.9018 | −6.17623 | 1.2 |
| −10.9443 | −6.14559 | 1.2 |
| −7.89063 | −5.89863 | 1.2 |
| −4.7673 | −5.46238 | 1.2 |
| −1.59697 | −4.8629 | 1.2 |
| 1.600682 | −4.12415 | 1.2 |
| 4.807822 | −3.26866 | 1.2 |
| 8.008178 | −2.31854 | 1.2 |
| 11.1865 | −1.29475 | 1.2 |
| 14.32722 | −0.21401 | 1.2 |
| 17.41479 | 0.909277 | 1.2 |
| 20.43543 | 2.057995 | 1.2 |
| 23.37661 | 3.214377 | 1.2 |
| 26.22621 | 4.362346 | 1.2 |
| 28.97138 | 5.490149 | 1.2 |
| 31.60025 | 6.586432 | 1.2 |
| 34.10212 | 7.639942 | 1.2 |
| 36.46685 | 8.641441 | 1.2 |
| 38.68456 | 9.584579 | 1.2 |
| 40.7464 | 10.46448 | 1.2 |
| 42.64512 | 11.27678 | 1.2 |
| 44.3749 | 12.01842 | 1.2 |
| 45.93157 | 12.68746 | 1.2 |
| 47.31294 | 13.28271 | 1.2 |
| 48.51897 | 13.80378 | 1.2 |
| 49.55194 | 14.25097 | 1.2 |
| 50.41653 | 14.62549 | 1.2 |
| 51.11939 | 14.93077 | 1.2 |
| 51.57092 | 15.33064 | 1.2 |
| 51.71015 | 15.75574 | 1.2 |
| 51.73096 | 16.06799 | 1.2 |
| 51.71082 | 16.2648 | 1.2 |
| 51.67841 | 16.41305 | 1.2 |
| 51.63534 | 16.54705 | 1.2 |
| 51.56089 | 16.71443 | 1.2 |
| 51.40303 | 16.95737 | 1.2 |
| 51.09787 | 17.24212 | 1.2 |
| 50.54365 | 17.29237 | 1.2 |
| 49.85133 | 17.13174 | 1.2 |
| 49.00036 | 16.93409 | 1.2 |
| 47.9832 | 16.70045 | 1.2 |
| 46.79475 | 16.43322 | 1.2 |
| 45.43195 | 16.13686 | 1.2 |
| 43.89367 | 15.81798 | 1.2 |
| 42.18068 | 15.48515 | 1.2 |
| 40.29534 | 15.15046 | 1.2 |
| 38.24194 | 14.8283 | 1.2 |
| 36.02688 | 14.53441 | 1.2 |
| 33.65889 | 14.28513 | 1.2 |
| 31.14883 | 14.09835 | 1.2 |
| 28.51016 | 13.99043 | 1.2 |
| 25.75852 | 13.97418 | 1.2 |
| 22.91129 | 14.0599 | 1.2 |
| 19.98752 | 14.2543 | 1.2 |
| 17.00651 | 14.55731 | 1.2 |
| 13.98709 | 14.96106 | 1.2 |
| 10.94684 | 15.4518 | 1.2 |
| 7.90381 | 16.02192 | 1.2 |
| 4.87306 | 16.65077 | 1.2 |
| 1.864725 | 17.29987 | 1.2 |
| −1.10619 | 17.95776 | 1.2 |
| −4.0327 | 18.57813 | 1.2 |
| −6.90552 | 19.12284 | 1.2 |

TABLE 1-continued

| X | Y | Zadim |
|---|---|---|
| −9.71451 | 19.54718 | 1.2 |
| −12.445 | 19.80245 | 1.2 |
| −15.0742 | 19.8401 | 1.2 |
| −17.5698 | 19.61942 | 1.2 |
| −19.8841 | 19.12235 | 1.2 |
| −21.9694 | 18.36597 | 1.2 |
| −23.7907 | 17.40365 | 1.2 |
| −25.3367 | 16.30984 | 1.2 |
| −26.6184 | 15.16011 | 1.2 |
| −27.66 | 14.01862 | 1.2 |
| −28.491 | 12.93388 | 1.2 |
| −29.1403 | 11.93996 | 1.2 |
| −29.6346 | 11.05942 | 1.2 |
| −29.9983 | 10.30599 | 1.2 |
| −30.2545 | 9.686707 | 1.2 |
| −30.4247 | 9.202645 | 1.2 |
| −30.5295 | 8.849557 | 1.2 |
| −30.5876 | 8.618114 | 1.2 |

In the above table, the plane Zadim=0 corresponds to the reference plane P0 situated at the base of the profile. This plane P0 is the intersection of the stacking axis AE of the arm 16B with the axisymmetric surface 12A of the hub, i.e. it passes via the intersection between the axis AE and the surface 12A where it is assembled with the hub 12. The plane Zadim=1 corresponds to the reference plane P1 situated at the top of the profile. This plane P1 is the intersection between the axis AE and the axisymmetric surface 14A of the shroud 14, i.e. it passes via the intersection of the axis AE with the surface 14A where it is assembled with the shroud 14.

By convention, the stacking axis AE of the arm 16A is the axis that extends in the radial direction Z and passes through the barycenter of the profile of the arm in section in the X, Y planes. This is the axis on which the various X,Y sections of the arm are "stacked" when designing the arm.

As mentioned at the beginning of the present description, the aerodynamic profile of the invention is substantially identical to the nominal profile defined in the above table, i.e. it departs from said nominal profile by very little at most, being defined in particular within an envelope of ±1 mm in a direction normal to the surface of the nominal profile, and/or having X,Y coordinates lying within a range of ±5% relative to the coordinates X,Y of the nominal profile.

The coordinates of the above table are given starting from a value Zadim=0 in the reference plane P0. The coordinate Zadim is non-dimensional, i.e. for a point P, situated at a distance D from the plane P0 (where D is measured along the axis Z), the value of Zadim is D/H, where H represents the total height of the profile as measured between the planes P0 and P1. Naturally, in the table above, by multiplying the coordinate Zadim by the height H, it is possible to obtain the complete coordinates of the arm.

Preferably, the height H of the profile of the arm lies in the range 240 mm±10%. By way of example, the reference plane P0 is at a distance of about 340 mm±10% from the axis A of the turbine.

In the above table, the profile is characterized by fifteen section planes at constant Zadim coordinates, for which the coordinates X and Y are specified. These fifteen section planes include eleven section planes located between Zadim=0 and Zadim=1, and thus arranged in the fluid stream, these section planes being distributed on the arm's height from P0 to P1. The fifteen section planes also include four section planes which are substantially outside the fluid stream (two section planes with Zadim<0, and two section planes with Zadim>1), these four section planes being provided for ensuring geometric continuity of the stacking, close to the head and the foot, respectively. In each section plane at constant coordinate Zadim, the section of the profile is given by a continuous and smooth curve, interconnecting all of the points (X,Y). In each section plane, the profile is interpolated so as to generate a uniform profile.

We claim:

1. An aerodynamic profile for an arm of a structural casing of a turbine having a central hub and a shroud, the arm connecting the central hub and the shroud, the aerodynamic profile defining the arm when in a cold state and in a non-coated state, the aerodynamic profile being substantially identical to a nominal profile determined by Cartesian coordinates X,Y,Zadim given in Table 1, in which the coordinate Zadim is a quotient D/H, where D is a distance of a point under consideration from a first reference X,Y plane situated at a base of the nominal profile, and H is a height of said profile measured from said first reference plane that is the intersection of a stacking axis of the arm and an axisymmetric surface of the hub, out to a second reference plane that is the intersection of said stacking axis with an axisymmetric surface of the shroud, measurements D and H being taken radially relative to an axial direction of the turbine, while the coordinate X is measured in the axial direction of the turbine.

2. The aerodynamic profile as claimed in claim 1, wherein said profile is defined within an envelope of ±1 mm in a direction normal to the surface of the nominal profile.

3. The aerodynamic profile as claimed in claim 1, wherein the coordinates X,Y of said profile lie within a range of ±5% relative to the coordinates X,Y of the nominal profile.

4. The aerodynamic profile as claimed in claim 1, wherein the arm is a main arm belonging to a series of arms connecting the central hub and the shroud, said series of arms comprising at least one main arm and at least one secondary arm, the main arm being arranged in a continuation of a link connecting the shroud to an external ring, while the secondary arm is not located in the continuation of such link.

5. The aerodynamic profile as claimed in claim 1, wherein the structural casing is an exhaust casing of the turbine.

6. An arm of a structural casing of a turbine, presenting an aerodynamic profile as claimed in claim 1.

7. A turbine comprising a structural casing, said structural casing comprising a plurality of arms presenting aerodynamic profiles as claimed in claim 1.

8. A turbine as claimed in claim 7, wherein the structural casing is an exhaust casing.

9. A turbine comprising a structural casing, said structural casing comprising a central hub and a shroud, and a series of arms connecting the central hub and the shroud, said series of arms comprising at least one main arm and at least one secondary arm, the main arm being arranged in a continuation of a link connecting the shroud to an external ring, while the secondary arm is not located in the continuation of such link, wherein the at least one main arm presents an aerodynamic profile as in claim 1.

10. The turbine as claimed in claim 9, wherein the structural casing is an exhaust casing.

11. The turbine as claimed in claim 9, including between 3 and 5 main arms that present an aerodynamic profile comprising:

when in a cold state and in a non-coated state, the aerodynamic profile being substantially identical to a nominal profile determined by the Cartesian coordinates X,Y,Zadim given in Table 1, in which the coordinate Zadim is the quotient D/H, where D is the distance of the point under consideration from the first reference X,Y plane situated at the base of the nominal profile, and H is the height of said profile measured from said first reference plane that is the intersection of the stacking axis of the arm and the axisymmetric surface of the hub, out to the second reference plane that is the intersection of said stacking axis with the axisymmetric surface of the shroud, the measurements D and H being taken radially relative to the axial direction of the turbine, while the coordinate X is measured in the axial direction of the turbine.

12. The turbine as claimed in claim 9, wherein the series of arms comprises from 10 to 20 arms comprising from 3 to 5 main arms and from 7 to 17 secondary arms.

13. The turbine as claimed in claim 12, wherein all the main arms present an aerodynamic profile comprising: when in a cold state and in a non-coated state, the aerodynamic profile being substantially identical to a nominal profile determined by the Cartesian coordinates X,Y,Zadim given in Table 1, in which the coordinate Zadim is the quotient D/H, where D is the distance of the point under consideration from the first reference X,Y plane situated at the base of the nominal profile, and H is the height of said profile measured from said first reference plane that is the intersection of the stacking axis of the arm and the axisymmetric surface of the hub, out to the second reference plane that is the intersection of said stacking axis with the axisymmetric surface of the shroud, the measurements D and H being taken radially relative to the axial direction of the turbine, while the coordinate X is measured in the axial direction of the turbine.

\* \* \* \* \*